Aug. 27, 1929.  R. BROWNSON  1,726,141
DEPOT TRUCK BRAKE
Filed July 6, 1926   3 Sheets-Sheet 1

Inventor
Ralph Brownson
By A.S. Johnson
Attorney

Aug. 27, 1929.  R. BROWNSON  1,726,141
DEPOT TRUCK BRAKE
Filed July 6, 1926    3 Sheets-Sheet 2

Inventor
Ralph Brownson
By J. H. Johnson
Attorney

Aug. 27, 1929.   R. BROWNSON   1,726,141
DEPOT TRUCK BRAKE
Filed July 6, 1926   3 Sheets-Sheet 3

Inventor
Ralph Brownson
By
Attorney

Patented Aug. 27, 1929.

1,726,141

UNITED STATES PATENT OFFICE.

RALPH BROWNSON, OF HASTINGS, MINNESOTA.

DEPOT TRUCK BRAKE.

Application filed July 6, 1926. Serial No. 120,630.

The present invention relates to a hand truck brake.

In hand trucks of the type employed for handling mail and baggage in depots and in mail terminals, it is desirable, when not in use, to have the wheels of the trucks locked to prevent their being accidentally set in motion and rolling onto the railroad track or injuring a bystander.

An object of the present invention is to simply and positively lock the wheels of a vehicle by means operated by the weight of the handle.

Another object is to provide a simple and positive brake for a hand truck, wherein the weight of a handle will actuate braking mechanism to lock the wheels of the truck when the handle is released, and which may also be manipulated to lock the wheels when the handle is in a raised position.

In order to attain these objects, there is provided, in accordance with one feature of the invention, a support fastened to a truck member and having a brake mechanism mounted thereon. A chain operatively connects the brake mechanism to the handle of the truck upon which the brake mechanism is mounted. The weight of the handle acts upon the brake mechanism to lock the brakes when the handle is released, while a counterweight associated with said mechanism releases the brakes when the handle is raised to an operative position.

The handle may be provided with hinged means to permit raising it to a vertical position when the truck is not in use, and may be drawn downward when in this vertical position by means mounted upon the truck to operate the brake mechanism, if required.

These and other features of the invention, not specifically mentioned, will be more fully brought out in the following description and the accompanying drawings, wherein.

Figure 5:
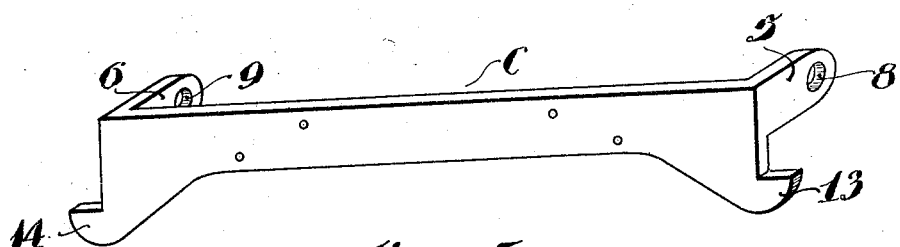
Figure 6:
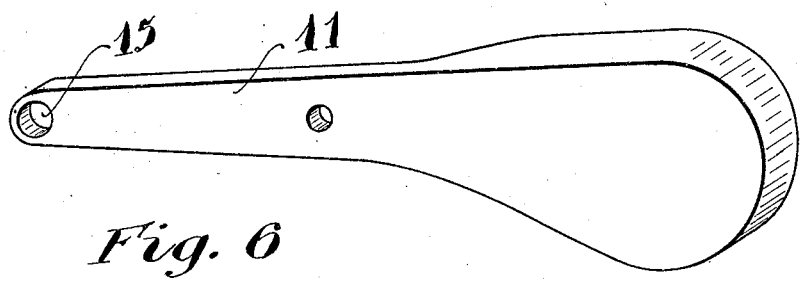
Figure 7:
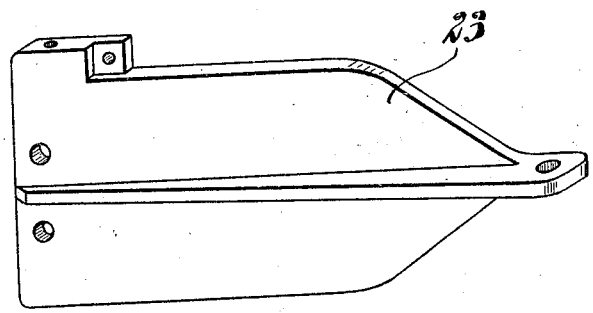

Figures 5, 6, and 7 are enlarged perspective views of portions of the brake mechanism that will be described in detail in the body of the specification.

Referring to the drawings in detatil, a depot truck A has a front portion B thereof supported upon a bunker 1 which is pivotally connected to an upper portion 2. An axle 3 is securely mounted across the lower side of the bunker and is provided with wheels 4 at the outer ends thereof in a customary manner.

Connected to the rear face of the bunker 1 and positioned to have arms 5 and 6 thereof extending forwardly of said bunker, is a brake mechanism supporting member C which may be of cast metal. The forwardly extending arms of the member C are provided with openings 8 and 9 in which a rod 10 is mounted. Pivotally connected to the ends of the rod 10 are weighted support arms 11 and 12. The support arms 11 and 12 are here shown as of cast metal with the rear portion thereof enlarged to form a counterweight to a brake mechanism which is mounted upon the forward ends of said arms. Stop members 13 and 14, cast integrally with the support member C are positioned to engage the support arms 11 and 12 rearwardly of their point of pivotal connection to the rod 10 so as to limit the downward swing of the weighted rear ends of said support arms.

Figure 1:
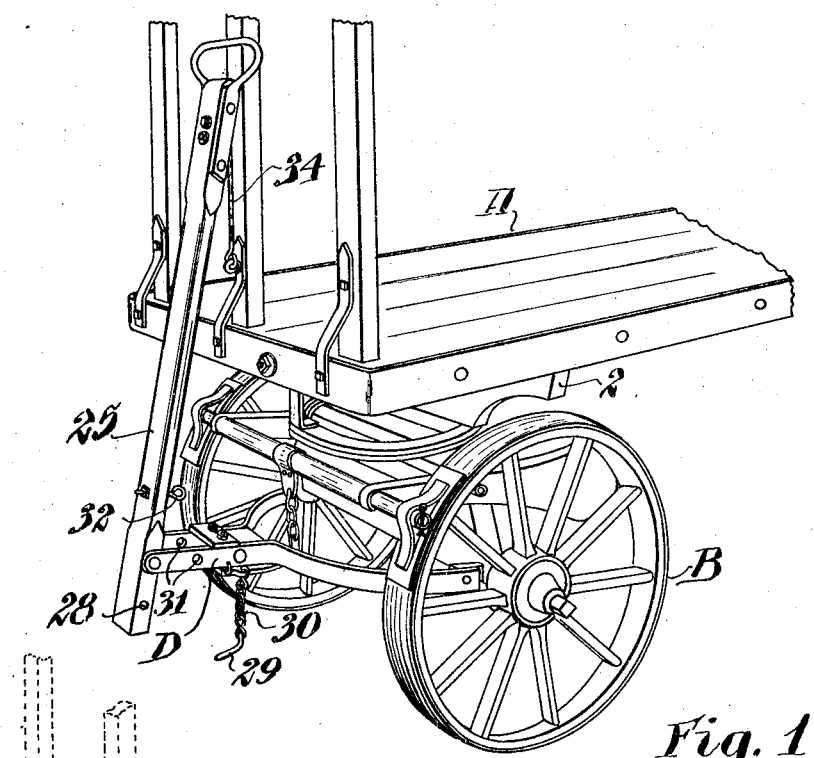
Figure 1 is a view in perspective of the front portion of a hand truck having brake mechanism made in accordance with the present invention mounted thereon, the truck handle being raised to an inoperative position and the brakes locked.
Figure 2:
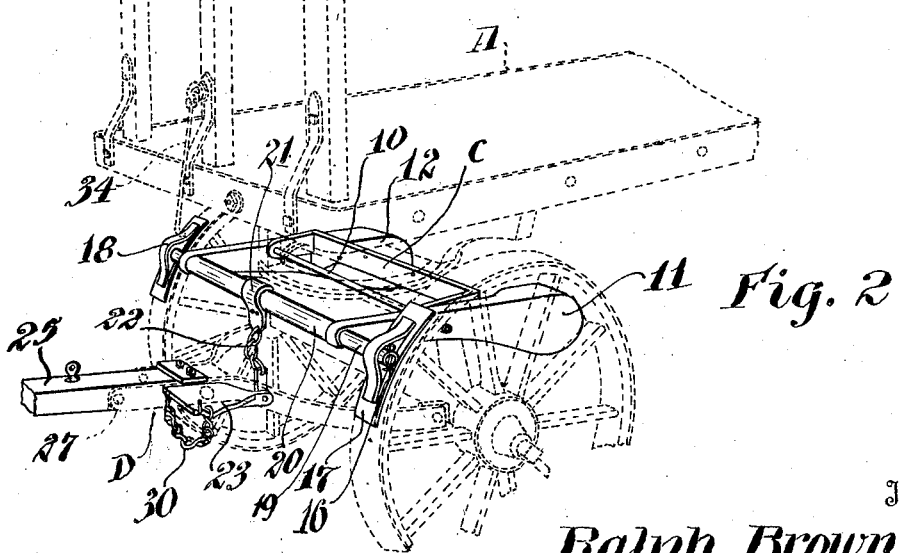
Figure 2 is a view, also in perspective, of the front portion of the truck, with the handle raised to the position it occupies when the truck is being drawn with the brakes in a released position, the truck being shown in dotted lines and the brake structure and associated parts in solid lines.

Supported in openings 15 in the forward ends of the weighted support arms 11 and 12 is a tubular member 16 having brake shoes 17 and 18 mounted upon the outer ends thereof. A second tubular member 19 is telescopically mounted upon the tubular member 16 to rest against the inner faces of the brake shoes to hold them in properly spaced position thereon. A third tubular member 20 is in turn telescopically mounted upon the second tubular member 19 to lie interiorly of the weighted support arms 11 and 12 to reinforce the central portion of said tubular members and to hold the weighted arms 11 and 12 in properly spaced relation. A clasp 21 of sheet metal embraces the central portion of the tubular member 20 and is connected by means of a chain 22 to a plate 23 bolted to the lower face of the inner end of a handle D. The handle D comprises a tongue 25 pivotally connected between the forward ends of yoke members 26 by means of a bolt 27. The handle is perforated as at 28 entirely therethrough and an anchor pin 29 which is connected by means of a chain 30 to the plate 23 may be inserted entirely through the opening 28 in the tongue and through openings 31 in the yoke members to anchor the tongue against pivotal movement with respect to the yoke members when in an extended position, as shown in Figure 2. An eyelet bolt 32 and an eyelet plate 33 are mounted on the tongue, the lower eyelet 32 being mounted to be engaged by a hook 34 on the forward end of the truck when the tongue is raised to an inoperative position with the brakes released, while the upper eyelet is mounted for engagement with the hook 34 when the tongue is in the raised position shown in Figure 1, with the brakes locked.

The upper eyelet 33 is positioned with respect to the hook 34 to require downward pressure on the tongue before engagement with the hook 34. This causes the brakes to be moved to a locking position when the tongue is thus fastened. The hooking of the tongue to exert a downward pressure on the braking mechanism when the tongue is in a vertical position, as shown in Figure 1, is desirable, since the tongue in the vertical position has not sufficient leverage to overcome the weight of the counterweights on the support arms 11 and 12.

Figure 3:
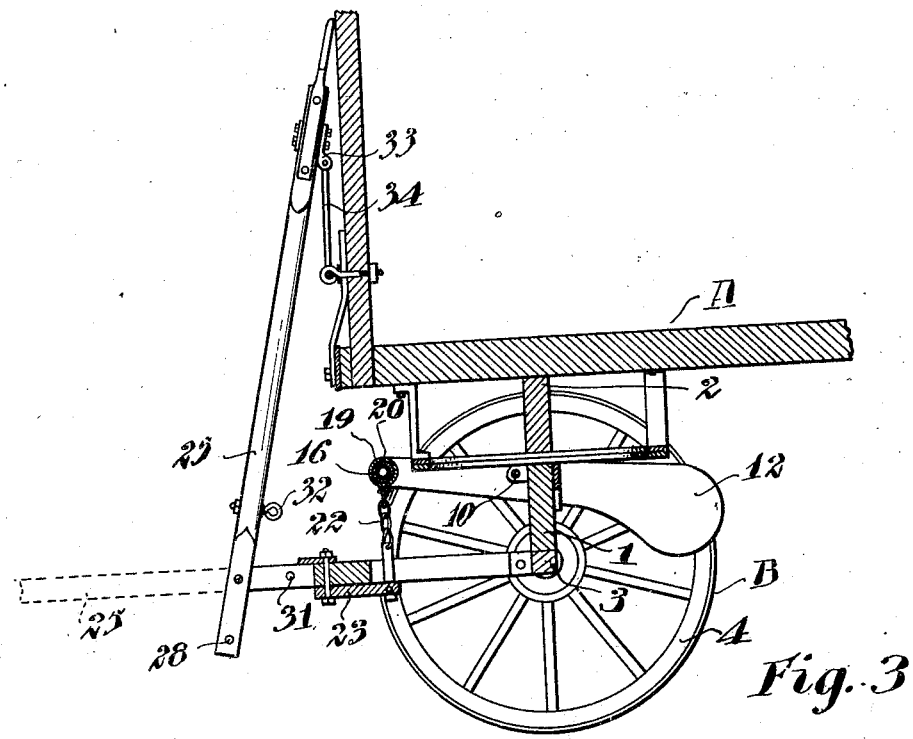
Figure 3 is a view in longitudinal section through the front portion of a truck, showing the handle raised and the brake mechanism actuated, the position of the handle when it is released by an operator being shown in dotted lines.
Figure 4:
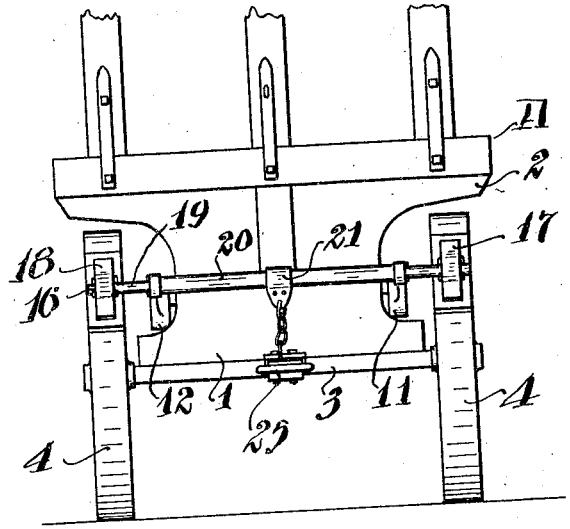
Figure 4 is a view in front elevation of the truck with the handle released and the brake mechanism actuated.

When it is desired to manipulate the truck, the tongue is swung down to the straightened position shown in Figure 2, and the anchor pin 29 is inserted through the perforations 28 and 31 in the tongue and the yoke members, respectively. With the tongue in this position, raising of the handle to an operating position by the operator, as shown in Figure 2, releases the chain 22, permitting the counterweights to swing the brake shoes upwardly to an inoperative position. Upon the completion of a manipulation the truck may be locked by releasing the tongue, the weight of the tongue when in an extended position being sufficient to draw the brakes down into a locked position, as is shown in Figure 3 in dotted lines, and in Figure 4. If desired, the brakes may be left in a released position with the handle extended by raising the handle and engaging the lower eyebolt 32, by means of the hook 34.

I claim:

1. A brake mechanism for a wheeled truck, having a movable handle; comprising a pair of arms pivotally supported upon a truck element, a cross member interconnecting said arms, a brake shoe mounted upon each end of said cross member adjacent a truck wheel, a counterweight mounted upon each of said arms to normally hold the brake shoes out of engagement with said truck wheels, stop means mounted in the path of pivotal movement of said arms to limit their swing under the impulse of said counterweights, and means connecting the cross member to the handle to draw the brake shoes into operative engagement with the truck wheels when the weight of the handle is carried by said connecting means.

2. A brake mechanism for a wheeled truck, having a movable handle, said handle being pivoted intermediate the ends thereof to have an extended position and a vertically disposed position, a support member carried by a truck element, an arm pivoted on said support member, a brake shoe carried by said arm to normally lie in spaced relation to a wheel of said truck, means connecting the handle and the brake shoe into operative engagement with the wheel when the handle is extended and the weight thereof is supported by said connecting means, and locking means acting intermediate the handle and the truck when the handle is in a vertically disposed position to depress the handle and draw the brake shoe into operative engagement with the wheel.

In testimony whereof I affix my signature.

RALPH BROWNSON.